Feb. 14, 1939.  F. W. ARMYTAGE  2,147,393
MACHINE FOR THE MANUFACTURE OF GLASS BOTTLES AND THE LIKE
Filed Nov. 6, 1936  3 Sheets-Sheet 1

Inventor
Frederick William Armytage.
By Cushman, Darby & Cushman
Attorneys

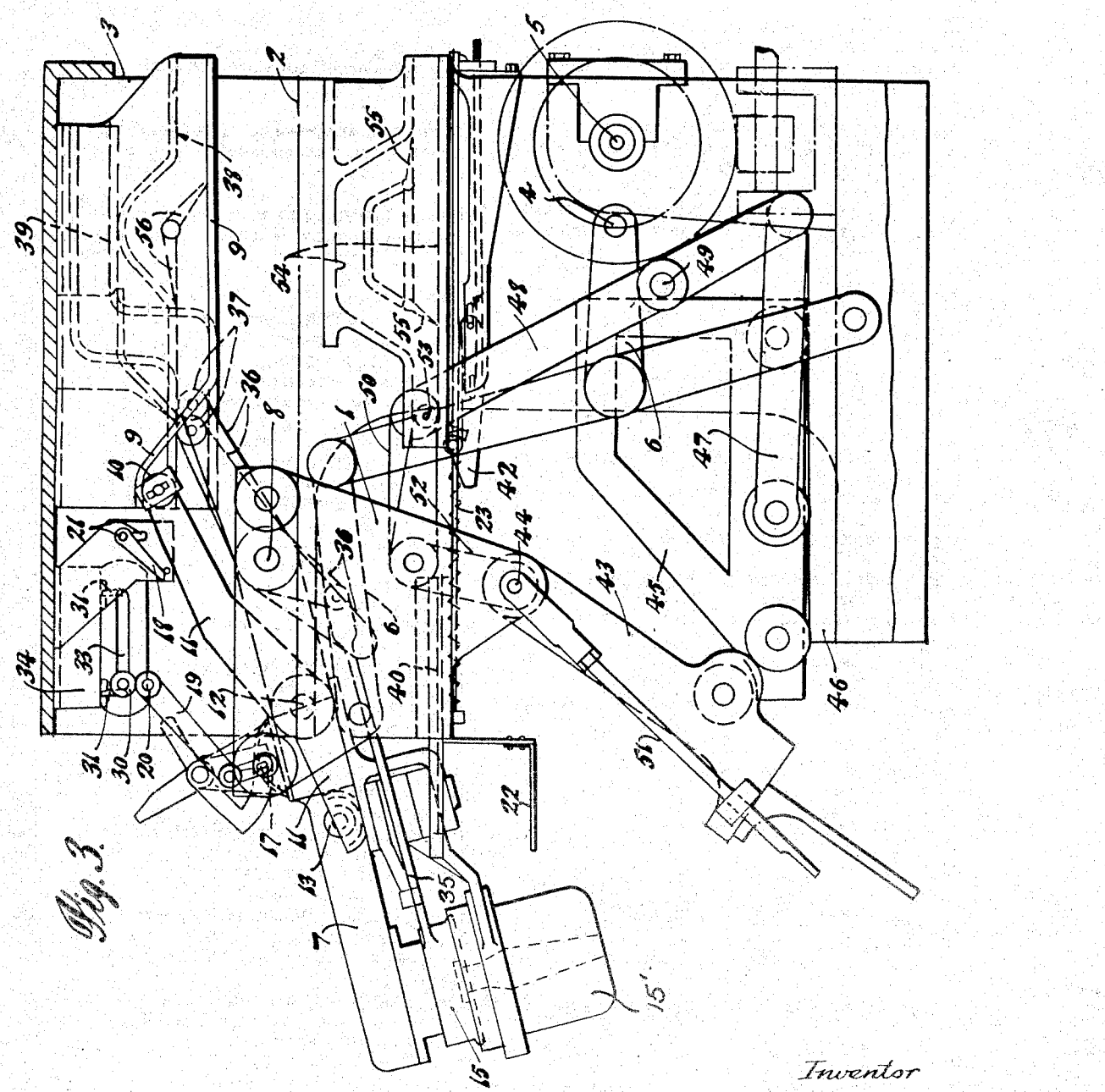

Patented Feb. 14, 1939

2,147,393

UNITED STATES PATENT OFFICE 2,147,393

MACHINE FOR THE MANUFACTURE OF GLASS BOTTLES AND THE LIKE

Frederick William Armytage, Knottingley, England

Application November 6, 1936, Serial No. 109,568
In Great Britain November 15, 1935

5 Claims. (Cl. 49—5)

This invention relates to machines for manufacturing glass bottles and like hollow articles of glassware (hereinafter termed "bottles"), the chief object being the provision of a new or improved machine, other than of the rotary intermittent type, which will dispense with the usual feeder for taking up and transferring the charges or gobs of molten glass from the hearth of the furnace to the parison mould.

According to the invention, the machine is of the suction-gathering type and the mould carriage of the machine has continuous reciprocating movement in a horizontal direction and the synchronous movements or operation of the suction head, moulds, and suction and blowing valves are effected by said reciprocating carriage and controlled by stationary track or face cams. Also the knife which severs the charge or gob in the parison mould from the molten glass or metal in the hearth may be operated or controlled by the reciprocating carriage, so that the machine is fully automatic and continuous in its action with all its movements synchronized. Where the bottles made have necks screwed internally, the reciprocating motion of the carriage would also be utilized to impart the necessary rotary and axial movement to the screwing plunger through the medium of appropriate gearing.

In order to provide for the manufacture of different sizes of bottles the positions or movements of the cams controlling the various parts may be adapted to be adjusted to suit requirements so as to alter the timing of the various motions or operations without affecting the synchronism or sequence.

In order that the invention may be clearly understood and readily carried into effect, the same will now be more fully described with reference to and by the aid of the embodiment illustrated in the accompanying drawings; wherein:—

Figure 1:
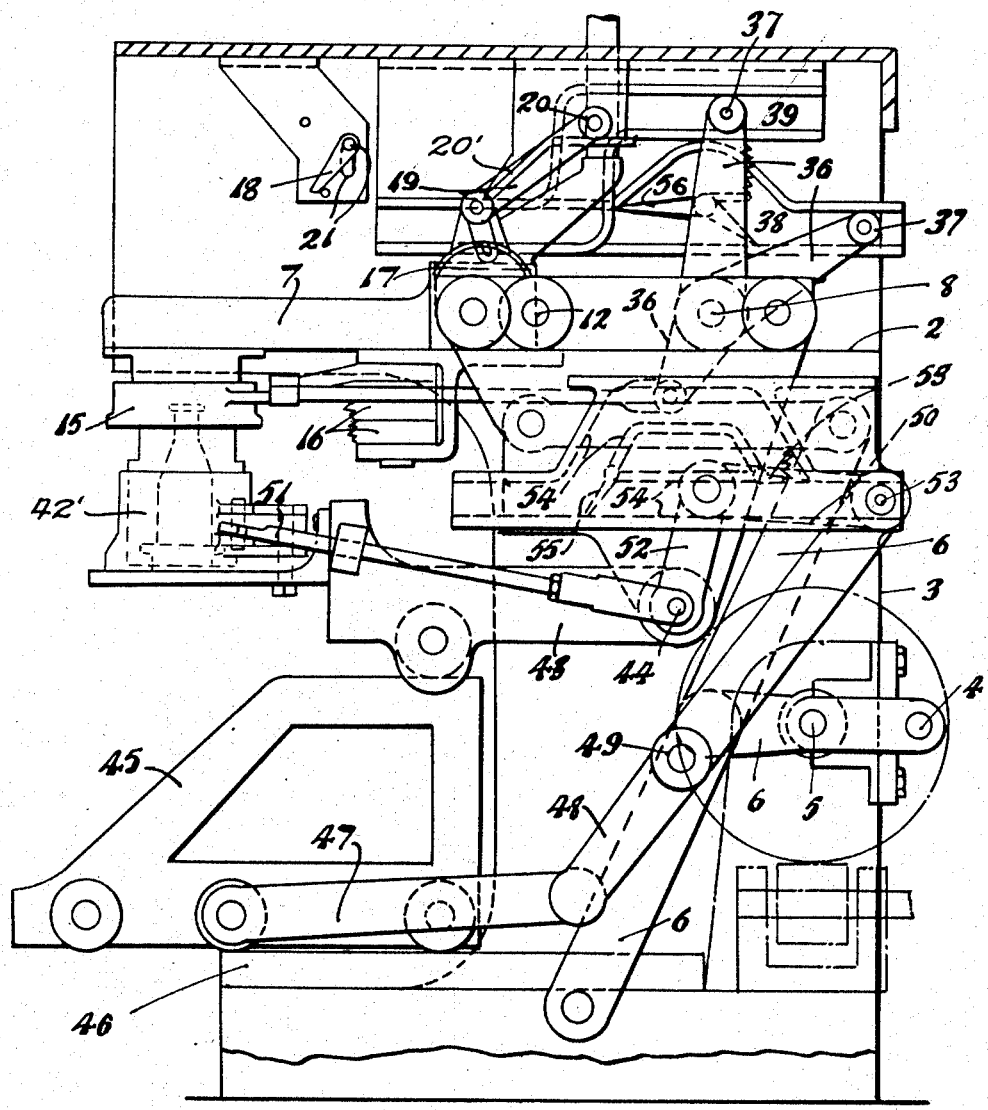
Figure 2:
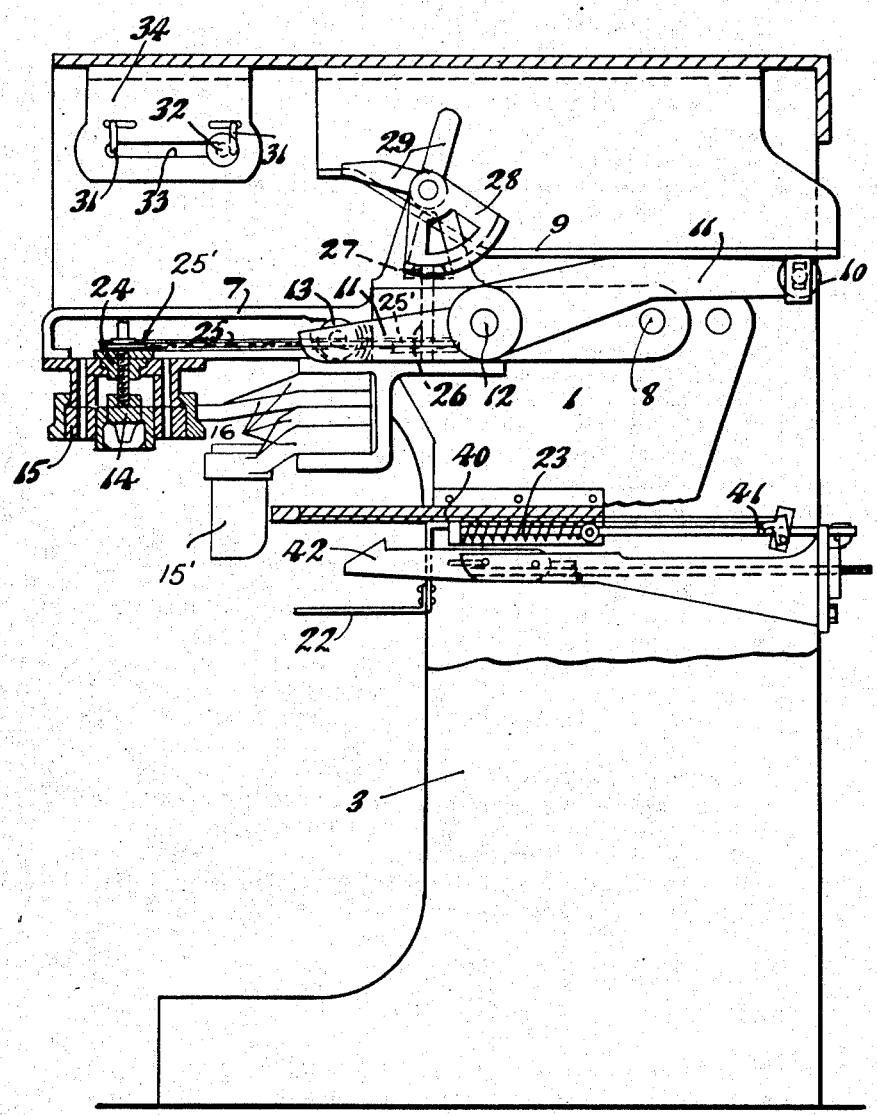

Figures 1, 2 and 3 are sectional side elevations of the machine illustrating the different parts and motions thereof.

Referring to the drawings, the mould carriage 1 is mounted to run in horizontal guides 2 in the machine frame 3 and is continuously reciprocated by a crank 4 on the main driving shaft 5 through the medium of lever and link mechanism 6. The suction head 7, which is connected by flexible pipes to sources of suction and compressed air, is pivotally mounted at 8 on the mould carriage 1, and said suction head 7 is controlled by a stationary track or face cam 9 engaging a cam follower 10 of a lever 11 pivoted at 12 on the trailing or rear end of the suction head 7 and operating upon rollers 13 on the latter, the cam 9 being so designed as to maintain the suction head 7 horizontal during the whole of the forward and return strokes except for a dipping action which it causes the suction head 7 to make as the driving crank 4 passes through the forward dead centre (see Figure 3). During this dipping motion the plunger 14 (Figure 2) approaches or enters the suction opening leading to the space enclosed by the closed neck mould 15 and parison mould 15', the halves or portions of both of which are carried by pivoted arms 16 on the suction head 7, whereupon a suction valve (not shown) is tripped so as to draw into the parison mould a charge of molten glass. The suction head 7 then rises, commences its return stroke and the vacuum is cut off as the suction valve is again tripped. The opening and closing of the air valve 17 is effected by a pivoted cam piece or detent 18 pivoted to the frame 3 which is tripped by the air valve operating lever 19 during the final part of the forward stroke of the mould carriage 1 and over which a roller 20 on said valve lever 19 is caused to ride in the initial part of the return stroke so as to open the valve 17 and then cause or allow it to close when the said roller 20 falls off or becomes disengaged from the cam piece or detent 18. In this connection the cam piece or detent 18 may be adjustable vertically say through a pin and slot mounting 21 as shown, to vary the period the air valve 17 is open.

The shearing blade 22 which has had its associated loading spring 23 tensioned during the preceding rearward stroke of the mould carriage 1 (i. e. from position shown in Figure 3 to that in Figure 2) has meanwhile been released and shot forwardly so as to sever the gob in the parison from the molten metal in the furnace hearth, just before the air valve lever is raised by the cam piece or detent as described above to cause a short or momentary blow back and so "pack" the parison mould.

The next operation during the receding or return stroke of the mould carriage 1 is the withdrawal of the plunger 14 from the neck of the partly formed bottle. This is effected by vertical screw gearing 24 operating upon the screwed stem of the plunger and driven say, through a chain 25 and sprockets 25'. One sprocket is connected with the plunger and the other sprocket is connected with the shaft 26 of a bevel wheel 27 in mesh with an actuating toothed segment 28 pivoted on the suction head 7 or a bracket thereon, said segment 28 being formed with extensions or arms 29 which are adapted to be tripped by a slidably mounted abutment 30 whose range of movement is limited by stops 31 so that the segment 28 will be rocked to operate the plunger 14 when said abutment 30 reaches either of said limiting positions. This abutment 30 may as shown conveniently comprise a roller or runner on a short shaft 32 which runs in a horizontal guide 33 formed in a bracket 34 fixed to the machine frame 3, said bracket 34 being fitted with adjustable stops 31 which project across or into the guide or slot 33 to limit its effective length.

The halves of the parison mould 15' now move apart so as to leave the partly formed bottle suspended by its neck in the closed ring mould 15, and the shearing blade 22 commences to be withdrawn rearwardly against the action of its spring 23 so as to be loaded again ready for the next severing stroke, whilst the finishing mould (not shown), which has just opened to discharge the previously made bottle commences to rise or swing upwardly and close upon the partly formed bottle in the ring mould 15. The opening of the ring and parison moulds is effected by links 35 which connect the pivoted arms 16 of the mould halves to double-ended levers 36 pivoted at 8 to the rear end of the suction head 7 and having their free ends fitted with cam followers 37, which, during the reciprocating movement of the mould carriage 1, are constrained to traverse offset cam tracks 38, 39 respectively which are fitted to the machine frame 3 and are preferably adjustable horizontally thereon. The shearing blade 22 has a lost motion connection with slides or guides 40 on the mould carriage 1 and during the latter half of the return stroke it is drawn back by a hook or hooks 41 so as to load the spring 23 until it is engaged by a retaining latch 42 whereupon the hook or hooks 41 are tripped out of engagement by a detent on the mould carriage. The finishing mould 42' is carried by a radius arm 43 pivotally attached at 44 to the mould carriage 1 and has its swinging movements imparted thereto by means of a travelling surface cam 45 which runs upon rails 46 on the machine bedplate or base and receives its reciprocating motion through a link connection 47 with one end of a double-ended lever 48 which is pivoted at 49 to the machine frame 3 and has its other end connected by a link 50 to the mould carriage 1. Thus as the mould carriage 1 moves backwards the travelling surface cam 45 moves forward and vice versa to impart swinging movements to the finishing mould, whilst the tail end of said travelling cam 45 is horizontal so as to retain the finishing mould in an up position during the latter part of the rearward movement or return stroke of the mould carriage and also during the initial portion of the forward stroke thereof (see Figure 1). The opening of the finishing mould after the falling movement thereof and the closing of the said finishing mould during or at the end of the upward swinging movement thereof are effected by link connection 51 with a bell-crank lever or rocker 52 fitted with a cam follower 53 which is constrained to move in stationary cam track 54 having forward and return ways controlled by pivoted latches or gates 55, and this cam is preferably adjustable horizontally on the machine frame.

After the finishing mould has closed upon the partly made bottle or gob, the air valve is opened and blowing continues to the end of the return stroke of the mould carriage 1, and for a portion of the forward stroke which now commences. The air valve is operated by a cam follower on its actuating lever being caused to ride over a stationary cam 20', and this cam is preferably adjustable horizontally so that the timing can be varied.

During the initial portion of the forward stroke of the mould carriage 1, the ring mould 15 is opened so as to release the bottle neck, the air is cut off and the finishing mould with its enclosed bottle begins to swing down. The opening and closing of the ring mould 15 is effected by the two way track cam 38 with its controlling latch or gate 56 acting upon or controlling the double-ended lever 36 which is pivoted to the suction head at its rear end and connected by the links 35 to the mould sections or the arms carrying them.

The ring mould and parison mould now close, and as the suction head 7 approaches its extreme forward position the plunger 14 is lowered into the ring mould opening ready for the next dip and suction operation. During these latter operations the finishing mould reaches its lowest position, as a result of the backward movement of its controlling cam 45, ready to discharge the completed bottle.

Where an internally screw-threaded neck is to be formed on the bottle, the plunger head would be pinned or otherwise non-rotatably fixed to the plunger stem and have a screw-threaded exterior mould surface.

The machine may be counter-balanced so as to reduce the power necessary to drive it, and in this connection the mould carriage may have chains or the equivalent connected therewith and passed rearwardly over pulleys, the depending ends of said chains having appropriate weights suspended therefrom.

I claim:—

1. Apparatus for forming hollow glass articles comprising a blank mold adapted to gather charges of molten glass by suction, a finishing mold in which parisons formed in the blank mold may be blown to final form, a carriage to which the said molds are connected, a frame on which said carriage is mounted for rectilinear movement, and means comprising a rotatable crank connected by link mechanism to said carriage whereby, upon rotation of the crank, the carriage and molds are reciprocated outwardly and inwardly, cam means operative upon outward movement of the carriage and molds for lowering the blank mold to gathering position and lowering the finishing mold to discharge position, and cam means operative upon inward movement of the carriage and molds for raising the blank mold and finishing mold to transfer position.

2. Apparatus for forming hollow glass articles comprising a blank mold adapted to gather charges of molten glass by suction, a finishing mold in which parisons formed in the blank mold may be blown to final form, mold supporting arms and a carriage to which said arms are pivotally attached for movement in vertical planes, a frame on which said carriage is mounted for rectilinear movement in a horizontal direction, means for imparting reciprocating movement to the carriage, and cam means associated with said arms and adapted to swing the arms in vertical planes when the carriage is moved in a horizontal direction.

3. Apparatus for forming hollow glass articles comprising a blank mold adapted to gather charges of molten glass by suction, a finishing mold in which parisons formed in the blank mold may be blown to final form, a carriage adapted to support the blank mold, a frame on which said carriage is slidably mounted, means for reciprocating said carriage in a horizontal and rectilinear direction whereby the blank mold is moved to and from charging position, a shear mounted for movement in a direction parallel to the direction of movement of the carriage, means normally tending to hold the shear in its outermost position, and means whereby rearward movement of the carriage causes rearward movement of the shear.

4. Apparatus for forming hollow glass articles comprising a blank mold adapted to gather charges of molten glass by suction, a finishing mold in which parisons formed in the blank mold may be blown to final form, a carriage to which the said molds are pivotally connected for movement in a vertical plane, a frame on which said carriage is mounted for horizontal and rectilinear movement, a cam follower associated with the blank mold and cooperating with a stationary cam track on said frame, and a cam follower associated with the finishing mold and adapted to cooperate with a movable cam, and means for imparting reciprocatory movement to said carriage and said movable cam whereby the said molds are moved in a vertical and horizontal direction.

5. Apparatus for forming hollow glass articles comprising a blank mold adapted to gather charges of molten glass by suction, a finishing mold in which parisons formed in the blank mold may be blown to final form, a carriage to which said molds are connected, a frame on which said carriage is mounted for rectilinear movement, a plunger associated with the blank mold and threadably mounted for movement in a vertical direction upon rotation, a sprocket wheel secured to said plunger, means including a sprocket wheel associated with said carriage, said sprocket wheels being connected by a chain whereby movement of the latter will rotate the plunger.

FREDERICK WILLIAM ARMYTAGE.